United States Patent [19]

Thurston et al.

[11] 3,929,217

[45] Dec. 30, 1975

[54] ARTICLE TRANSFERRING APPARATUS

[75] Inventors: Franklin J. Thurston, Rockville; Franciscus J. Schendeler, Gaithersburg; Joseph C. Jounen, Frederick, all of Md.

[73] Assignee: Fairchild Industries, Inc., Germantown, Md.

[22] Filed: June 1, 1973

[21] Appl. No.: 366,184

[52] U.S. Cl. ............... 198/23; 198/172; 214/7; 214/8.5 F; 244/116
[51] Int. Cl.² ............................. B65G 47/00
[58] Field of Search ....... 198/23, 20, 185, 188, 172, 198/173, 174, 32, 31 AB; 244/114, 115, 116; 214/8.5 F, 7

[56] References Cited
UNITED STATES PATENTS

| | | | |
|---|---|---|---|
| 2,247,694 | 7/1941 | Papendick | 198/32 X |
| 2,484,222 | 10/1949 | Hauswald | 198/32 X |
| 3,743,118 | 7/1973 | Fluck | 214/7 |

Primary Examiner—Evon C. Blunk
Assistant Examiner—Douglas D. Watts
Attorney, Agent, or Firm—Michael W. York

[57] ABSTRACT

An article transferring apparatus for transferring articles such as packages and the like including a table for supporting the articles, a paddle for moving the articles in a lengthwise direction and another paddle movably mounted to the first paddle for moving the articles across the width of the table. The table has a track which extends diagonally across its width and a cam follower is attached to the second paddle and movably engages the track to cause the second paddle to move across the width of the table as the first paddle sweeps the table in a lengthwise direction. Movement of the paddles results from the movement of a pair of motor driven chains which are connected to the paddle which sweeps the length of the table. A conveyor is provided for supplying articles to the table and the conveyor has sensing devices for detecting the presence of articles. Magnetic detectors and a control circuit are also provided to control the operation of the conveyor.

25 Claims, 6 Drawing Figures

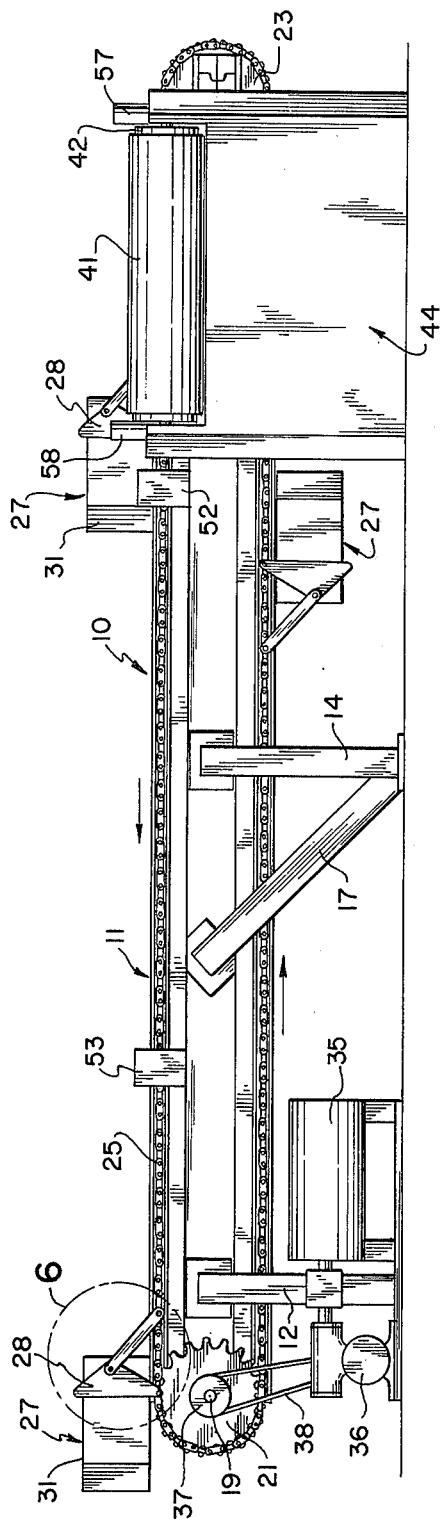
FIG. 1
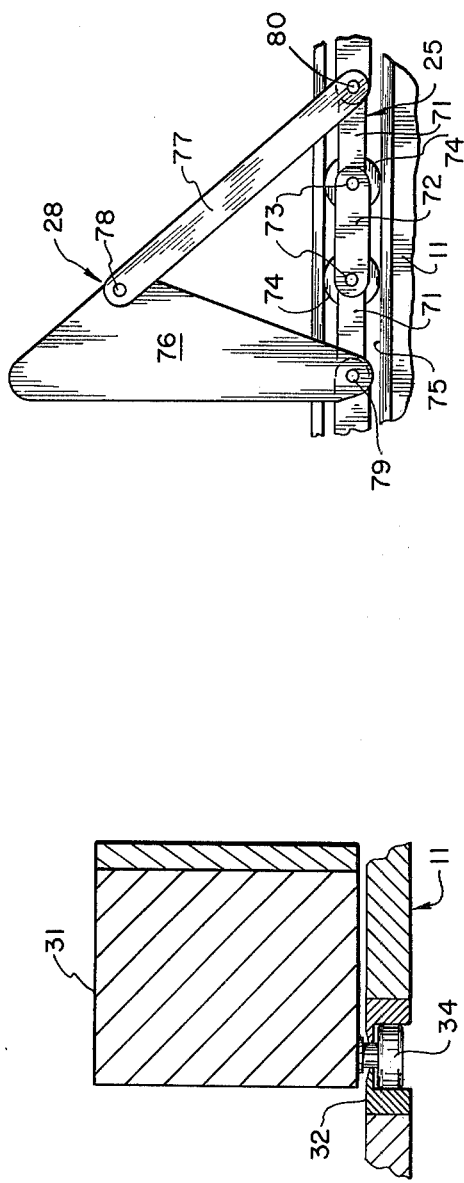
FIG. 6
FIG. 3

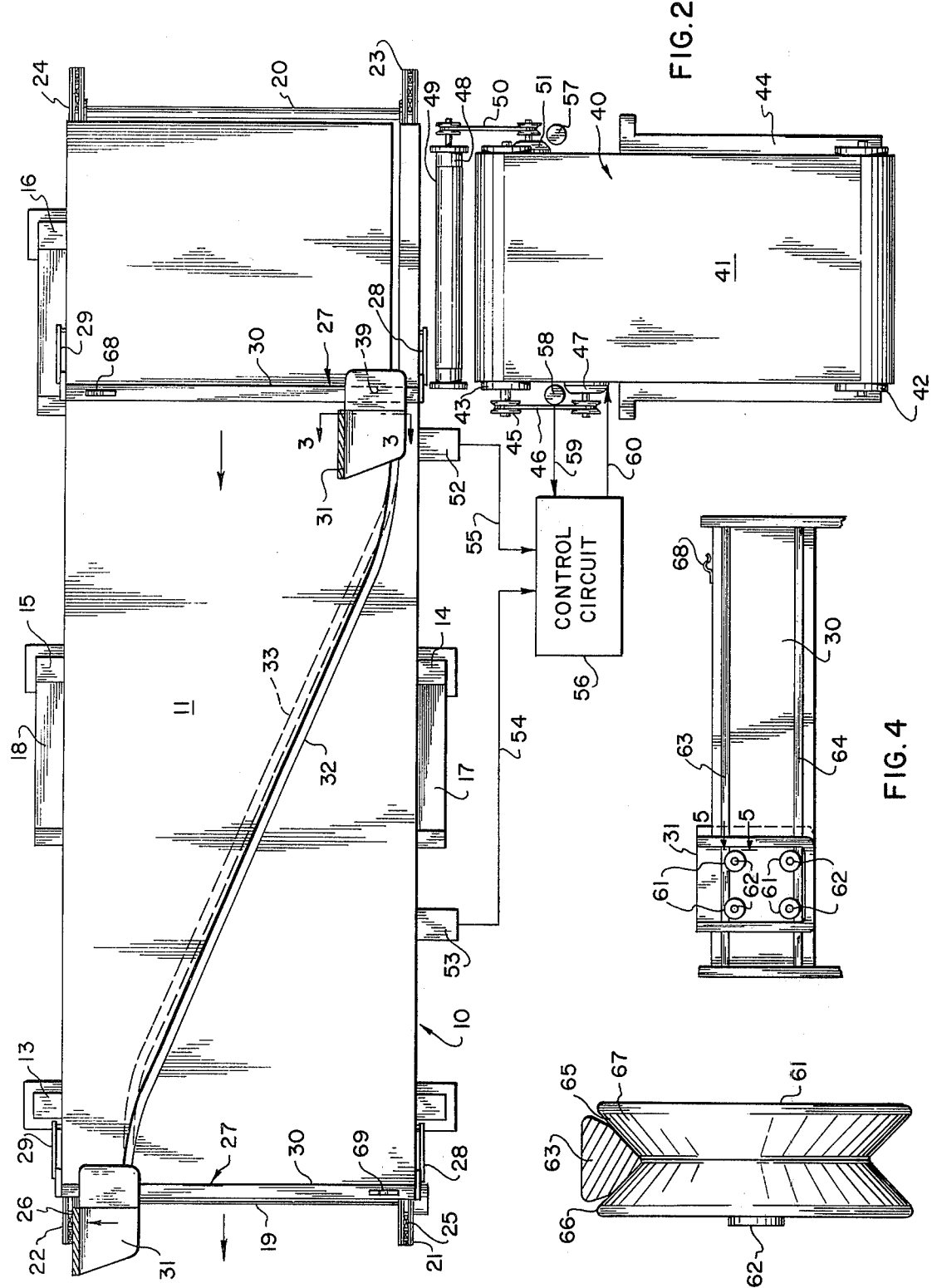

ARTICLE TRANSFERRING APPARATUS

BACKGROUND OF THE INVENTION

The volume of packages handled by the United States Postal Service precludes the use of individuals for manually transferring or handling articles such as packages and the like and requires high speed equipment to effectively transfer or handle these articles. A number of article transferring systems have been proposed in the past for loading the articles on trays or conveyors. Some systems have been proposed for loading conveyors or trays from above. Typical systems of this type are disclosed in U.S. Pat. Nos. 3,151,731 and 3,339,699. Unfortunately, these systems require the installation of expensive complex equipment. It is also apparent that damage is likely to occur to the articles if the conveyor or trays are moving at a high rate of speed in relation to the article transferring apparatus. In U.S. Pat. No. 3,147,845, another type of article transferring apparatus is disclosed which utilizes pivoted slats to permit articles such as packages to fall into an adjacent chute. This system which utilizes gravity to basically transfer the articles is not generally suitable for high speed operation since jamming of the articles can occur at high speeds. Another type of prior art article transferring apparatus is disclosed in U.S. Pat. No. 3,140,771 and this type of apparatus utilizes a moving conveyor and a moving deflector to transfer an article in two directions since the conveyor is moving in one direction and the deflector sweeps the article in another direction across the width of the conveyor.

A more advanced type of article transferring apparatus is disclosed in U.S. Pat. No. 3,693,776. This type of system, which is used for pushing articles onto a moving conveyor or moving trays, uses an overhead conveyor with downward extending paddles, which are connected to a track which extends diagonally with respect to the direction of travel of the trays or the conveyor so that paddles push articles onto the trays or the conveyor in a diagonal direction. Although such a system is an improvement over the prior art systems previously mentioned, it suffers from several deficiencies. This type of system is comparatively complex and costly. Furthermore, the use of an overhead conveyor and associated paddles presents moving machinery which may cause injury. The system is also noisy and is susceptible to jamming and lacks the ability to handle the inertia associated with heavy packages. These deficiencies noted with respect to prior art systems have been eliminated by the present apparatus.

The apparatus of the present invention provides means for transferring articles such as packages and the like at a high rate of speed. Furthermore, the apparatus is comparatively simple in operation, requires less space and is less costly than prior art systems. It also is safer and easier to operate than prior art systems.

BRIEF DESCRIPTION OF THE INVENTION

This invention relates to article transferring apparatus for transferring articles such as packages and the like and more particularly to article transferring apparatus in which the article is transferred diagonally across a table or the like.

It is an object of the present invention to provide an article transferring apparatus for the rapid transfer of articles.

It is also an object of the present invention to provide an article transferring apparatus which minimizes the probability of jamming the transport.

It is an object of the present invention to provide an article transferring apparatus which is capable of efficiently loading articles onto moving conveyors or trays.

It is an object of the present invention to provide an article transferring apparatus which can readily transfer articles without subjecting the articles to damage.

It is also an object of the present invention to provide an article transferring apparatus which exerts positive and precise control over the article being transferred.

It is also an object of the present invention to provide an article transferring apparatus which requires minimum floor area and presents very little moving machinery which can cause injury.

The present invention provides an article transferring apparatus including means for supporting an article and first article pushing means associated with the article supporting means for pushing an article or articles in a first direction along the upper surface of the article supporting means. The article transferring apparatus also includes second article pushing means in moving engagement with the first article pushing means and means connected to the second article pushing means and the article supporting means for causing the second article pushing means to move in a second direction to push the article or articles in a second direction along the upper surface of the article supporting means as the first article pushing means moves to push the article or articles in the first direction along the upper surface of the article supporting means. Means are also provided which are operatively connected to the first and second article pushing means for driving the first and second article pushing means.

BRIEF DESCRIPTION OF THE DRAWINGS

The invention will be hereinafter more fully described with reference to the accompanying drawings in which:

FIG. 1 is a side elevational view of the article transferring apparatus of the present invention with certain portions thereof omitted for clarity;

FIG. 2 is a top plan view of the article transferring apparatus illustrated in FIG. 1 with certain portions thereof omitted for clarity, but illustrating schematically a control circuit which forms part of the invention;

FIG. 3 is a sectional view of a portion of the apparatus illustrated in FIG. 2 taken on the line 3-3 thereof;

FIG. 4 is a rear elevational view of a paddle which forms part of the apparatus illustrated in FIGS. 1 and 2;

FIG. 5 is an enlarged sectional view of a portion of the apparatus illustrated in FIG. 4 taken on the line 5-5 thereof; and FIG. 6 is an enlarged side elevational view of a portion of the structure illustrated in FIG. 1 taken within the circle 6 thereof.

DETAILED DESCRIPTION OF THE PREFERRED EMBODIMENT

Referring first to FIGS. 1 and 2, the article transferring apparatus of the invention is illustrated and generally designated by the number 10. The article transferring apparatus 10 comprises an elongated rectangular shaped table 11 and means for supporting the table comprising the vertical supports 12, 13, 14, 15 and 16 which have their upper end portions connected to the table and the diagonal supports 17 and 18 whose upper end portions are connected to the table and whose lower respective ends are connected to the vertical supports 14 and 15. Horizontal shafts 19 and 20 are rotatably mounted at each end of the table 11. Sprockets 21 and 22 are rigidly connected to the respective ends of the shaft 19 and similar sprockets 23 and 24 are rigidly connected to the respective ends of the shaft 20. A driving chain 25 is connected to and extends between the sprockets 21 and 23 and a similar driving chain 26 is connected to and extends between the sprockets 22 and 24.

A plurality of article pushing means for pushing articles such as packages and the like are connected to the claims 25 and 26 by connecting means 28 and 29 located at the ends of the article pushing means, and are generally designated by the numbers 27. The article pushing means 27 comprises a paddle 30 for pushing an article lengthwise along the table 11 and another paddle 31 for pushing an article crosswise across the width of the table. As best illustrated in FIG. 2, a track or slot 32 is provided in the upper surface of the table 11 and a corresponding return track 33 is provided in the lower surface underneath the table 11. These tracks 32 and 33 are adapted to receive a cam or track follower such as the track follower 34 illustrated in FIG. 3 which is connected to the paddle 31.

As illustrated in FIG. 1 the chains 25 and 26 are driven by a motor 35 and the associated transmission 36 which is connected to the motor, the pulley 37 which is securely fastened to the drive shaft 19 of the sprockets 21 and 22 and the driving belt 38 which is connected to the transmission and to the pulley 37. When the motor 35 is operating, this causes the chains 25 and 26 to revolve and also causes the connected paddles 30 to move lengthwise along the table 11 in the direction indicated by the arrows in FIG. 1. Since the tracks 32 and 33 extend diagonally across the surfaces of the table 11 and since the track followers 34 which are connected to the paddles 31 engage and move along the diagonally extending tracks, movement of the paddles 30 also causes movement of the respective paddles 31 across the width of the table as illustrated by the arrows in FIG. 2. As a consequence, any article which is engaged by the paddles 30 and 31 will be moved along the length of the table 11 and across its width, simultaneously.

Means for feeding articles comprising the conveyor generally designated by the number 40 is provided for feeding articles to the article transferring apparatus 10. The conveyor 40 has a conveyor belt 41 and two rollers designated 42 and 43 which engage the conveyor belt. A support structure 44 is connected to and rotatably supports the rollers 42 and 43. A pulley 45 is connected by a drive shaft to the roller 43 and a driving belt 46 is connected to the pulley and to a motor 47 so that the motor can drive the roller 43 and the belt 41. A kicker roller 48 is located at the end of the conveyor 40 which is closest to the article transferring apparatus 10 and it is rotatably mounted to either the side of the table 11 or to the end of the conveyor by suitable means (not shown) which are known in the art. This kicker roller 48 serves the purpose of kicking articles from the conveyor 40 onto the adjacent end of the table 11 of the article transferring apparatus. The kicker roller 48 has a high friction surface 49 comprising vulcanized rubber which engages and moves the articles as the roller rotates. A pulley 50 is rigidly connected to one end of the kicker roller 48 and a drive belt extends from the pulley to a motor 51 so that the motor can drive the kicker roller.

A magnetic detector 52 is located adjacent to the left edge of the table 11 near the conveyor 40 and is fastened to the edge of the table. Another magnetic detector 53 is located adjacent to and connected to the left edge of the table 11 at a location which is further down the table. These magnetic detectors 52 and 53 detect the presence of the paddles 31 as they move along the track 32. When the magnetic detector 52 or 53 detects the presence of a paddle 31 it transmits an electrical signal along the respective lead 54 or 55 which are connected to a control circuit 56 (FIG. 2). A light source 57 is located adjacent to the right hand edge of the conveyor 40, near the end of the conveyor which has the kicker roller 48 located adjacent to it. The light source 57 provides a beam of light which extends across the width of the conveyor 40 directly above the upper side of the belt 41. A photoelectric detector 58 is located directly opposite the light source 57 and when the light from the light source is interrupted by a package or the like on the belt 41, the photoelectric detector transmits a signal along the lead 59 to the control circuit 56. The control circuit 56 is connected by the lead 60 to the motor 47 which operates the conveyor belt 41 so that the control circuit can cause the motor 47 to be turned on or off.

During normal operation, the motor 51 through the belt 50 continuously operates the kicker roller 48 and the motor 47 and the belt 46 also operates the conveyor belt 41 to transport an article such as a package or the like towards the beam of light extending from the photoelectric detector 58 to the light source 57. When the article interrupts the beam of light from the light source 57 to the photoelectric detector 58, this causes a signal to be sent along lead 59 to the control circuit 56. If the control circuit 56 senses, as a result of the magnetic detectors 52 and 53 and their inputs from the respective leads 55 and 54 that a paddle 31 is located in that portion of the upper surface of the table 11 which is located between the two magnetic detectors, it then sends a signal along the lead 60 which causes the motor 47 to continue to operate and thus move the article towards the kicker roller 48. The kicker roller 48 will then in turn kick the article onto the adjacent end of the table 11 when the article moves into contact with the kicker roller.

If, however, the signals on the leads 54 and 55 from the respective detectors 53 and 52 indicate that the paddle 31 is outside of the limits encompassed by the detectors, which corresponds to the segment of the upper surface of the table 11 located between the detectors, the control circuit 56 sends a signal along the lead 60 to the motor 47 to shut off the motor. When a paddle 31 then comes within the limits of the magnetic detectors 52 and 53, the resulting signals along the leads 54 and 55 to the control circuit 56 causes the control circuit to transmit a signal along the lead 60 which turns on the motor 47 and causes the article to be placed upon the adjacent end of the table 11 in the manner previously described.

The control circuit 56, the associated magnetic detectors 52 and 53, the photoelectric detector 58 and associated light source 57 are very important since they prevent articles from being placed on the table 11 while a paddle 31 might interfere with the article.

The details of the manner in which the paddle 31 is connected to the paddle 30 are illustrated in FIG. 4 and FIG. 5. As illustrated in FIG. 4, four wheels 61 are provided on the rear of the paddle 31. These wheels 61 are rotatably mounted on stub shafts 62. The upper wheels 61 engage the bar 63 which is horizontally mounted on the upper portion of the rear of the paddle 30. The lower wheels 61 engage another horizontally mounted bar 64 which is mounted on the lower portion of the rear of the paddle 30. The paddle 31 itself has a slot 39 (FIG. 2) which receives the paddle 30. The manner in which these wheels rotatably engage the respective bars 63 and 64 is best illustrated in FIG. 5. As illustrated in FIG. 5, each wheel 61 has a V-shaped rim 65 and the projections 66 and 67 of the rim 65 extend around a portion of the rod 63 or 64 and as a consequence the paddle 31 is held in moving engagement with the paddle 30 by the rods and the wheels.

As illustrated in FIG. 2, the paddle 31 moves to various locations along the length of the paddle 30 as dictated by the track 32 or 33 and the track follower 34 which is connected to the underside of the paddle 31. When the paddle 31 is located near the end of the paddle 30 it comes into engagement with the spring 68 or 69 which is located on the upper surface of the respective end of each paddle 30. The spring 68 or 69 engages the paddle 31 and prevents relative movement between the paddles 30 and 31 which is necessary to prevent misalignment when the paddle 31 goes around either end of the table 11 to insure that its track follower 34 comes into proper engagement with the opposite track 32 or 33.

The details of the chain 25 and the connecting means 28 are illustrated in FIG. 6. The chain 25 comprises a series of alternating links 71 and 72 which are interconnected by link pins 73. The link pins 73 also rotatably mounted polyurethane rollers 74 on the interior of the ends of the links 71 and 72. These rollers 74 rotate within a groove 75 in the side of the table 11 and serve to guide and maintain the chain 25 in its proper position and to prevent it from sagging. The construction of the chain 26 is substantially similar to the chain 25.

The connecting means 28 comprises a generally triangular shaped flat plate 76 and an elongated flat support member 77 which has its forward end rotatably connected to a rearward corner of the plate by a pin 78. The plate 76 which extends generally upward from the chain 25 has its lower end rotatably connected to the chain by a pin 79, which is connected to the links of the chain. The support member 77 also has its lower end pivotally connected to the chain 25 by a pin 80 which is connected to the links of the chain. The inner surface of the vertically mounted plate 76 is rigidly connected to the end of the paddle 30. The construction of the connecting means 29 is substantially similar to the connecting means 28 except the connecting means 29 is substantially a mirror image of the connecting means 28 illustrated in FIG. 6. The unique construction of the connecting means 28 and 29 permits the paddles 30 and 31 to readily rotate around the ends of the table 11. However, when the paddles 30 and 31 are on top of or underneath the table 11 the support members such as the support member 77 are located in the position illustrated in FIG. 6 and the plate 76 or the corresponding plate of the connecting means 29 is prevented from moving either forward or in an aft direction and thus the paddle 30 and plate 31 are both held in a rigid upright position.

Normally, it is contemplated that the article transferring apparatus 10 will be used in conjunction with the conveyor trays of the type similar to those disclosed in U.S. Pat. No. 3,693,776 for the handling or the sorting of packages. In order to use the apparatus 10, the right edge of the table 11, or the edge located adjacent to the chain 26, is brought alongside the conveyor which has the trays that are to be loaded. The transferring apparatus 10 and the tray conveyor are synchronized for accurate loading. Normally, the article transferring apparatus 10 is also used in conjunction with the conveyor 40 which is positioned as illustrated in FIGS. 1 and 2 to convey or feed the packages onto the article transferring apparatus. The control circuit 56 is also normally utilized to coordinate the operation of the conveyor 40 and the article transferring apparatus 10. When the control circuit 56 is utilized, the magnetic detectors 52 and 53 are connected by the respective leads 55 and 54 to the control circuit and the light detector 58 which is located on the conveyor 40 is also connected to the control circuit by the lead 59. The control circuit 56 is in turn connected to the motor 47 by the lead 60.

The motor 35 and the motor 51 would then be started. The motor 35 which is connected to the gear box 36 will cause the belt 38 to rotate which in turn will cause rotation of the sprocket 21 and the opposite sprocket 22. The rotation of the sprockets 21 and 22 will cause movement of the respective chains 25 and 26 and this in turn will cause movement of the paddles 30 and 31 so that the paddles 30 move along the upper and lower surface of the table 11 in a lengthwise direction and the paddles 31 sweep across the width of the table. The operation of the motor 51 will cause rotation or movement of the belt 50 which in turn will result in the rotation of the kicker roller 48 and its friction surface 49. Normally, the motor 47 would then be started and this will cause movement of the belt 46 which is connected to the pulley 45 and this in turn will result in rotation of the roller 43. The rotation of the roller 43 will in turn result in movement of the belt 41 so that any article placed on top of the belt would be moved in a direction toward the kicker roller 48. The control circuit 56 would then normally be placed in operation and the articles such as packages and the like which are to be sorted or processed are placed upon the moving conveyor belt 41. The conveyor belt 41 moves the articles toward the kicker roller 48 until the first article intercepts the light beam extending from the light source 57 to the light detector 58. When this light beam is interrupted, the light detector 58 sends a signal along the lead 59 to the control circuit 56. At this time, the control circuit 56 determines, from the detectors 52 and 53 which send signals along the respective leads 55 and 54, whether a paddle 31 is located in front of kicker roller 48. If a paddle 31 is located in front of the roller 48, the control circuit 56 sends a signal along the lead 60 to the motor 47 to shut off the motor.

The motor 47 will remain shut off until paddle 31 has cleared the front of roller 48 as indicated by the detector 52 and 53. At this time a signal is sent along the lead 55 to the control circuit 56 and the control circuit in turn sends a signal along the lead 60 to the motor 47 to cause the motor to be turned on. When the motor 47 is turned on, this causes the belt 41 to rotate and move the article towards the kicker roller 48. When the article reaches the kicker roller 48, the high friction surface 49 causes the article to be pushed onto the upper surface of the adjacent portion of the table 11. The next paddle 30 which moves across this portion of the table 11 then engages the article after the paddle has swept around the end of the table which has the sprockets 23 and 24. This paddle 30 pushes the article lengthwise along the upper surface of the table 11 and its associated paddle 31 also simultaneously pushes the article across the width of the table. The article is thus pushed diagonally across the upper surface of the table 11 until it reaches the righthand side of the table, where it is pushed off the table and onto a suitable moving tray or conveyor (not shown). If a paddle 31 had been located between the detectors 52 and 53 in the first instance the signals on the leads 54 and 55 would indicate this fact and the control circuit 56 would not have sent any shut off signal to the motor 47 along the lead 60. As a consequence, the article would have continued to move on the conveyor 41 past the light beam from the light source 57 and into the kicker roller 48 and it would have been transferred onto the end of the table 11.

Since the motor 47 is shut off when no paddle 31 is located between the detectors 52 and 53, no article is fed into the kicker roller 48 by the conveyor belt 41 during this time and thus no article can be transferred by the kicker roller 48 into an adjacently located paddle 31 which might be located near that end of the table. As a consequence the possibility of an interference occurring is prevented. In this connection, it should be noted in FIG. 1 that the article pushing means 27 which comprise the paddles 30 and 31 are spaced so that when one article pushing means is located between the detectors 52 and 53, no other article pushing means is located on the end of the table 11 near the kicker roller 48.

Although three sets of paddles 30 and 31 are illustrated in the drawings it should be noted that the number of sets of paddles can be increased or reduced. In fact, the system can be designed which will incorporate only one set of paddles. Generally, a multiplicity of sets of paddles provides a system which has higher processing rate capability. Regardless of the number of sets of paddles 30 and 31 which are used, it is desirable to maintain equal spacing between the paddles along the chains 25 and 26.

Should it be desired, the conveyeor 40 can be dispensed with and some other suitable feeding means can be substituted in its place. Such a substitute should have an article detection system to provide a signal to the control circuit which is similar to the signal provided by the detector 58 and it should also be connected to the lead 60 from the control circuit so that its motor is shut off upon receiving the proper signal from the control circuit, in order to prevent jamming from occurring. Of course, the control circuit 56 might be dispensed with along the conveyor 40. In that case some suitable means for preventing the article being placed on the table 11 while a paddle 31 is located on the end of the table would be required so that interference would not occur.

For high cyclic operation a conventional clutch and a conventional brake (not shown) can be utilized in conjunction with the motor 47 which drives the conveyor belt 41 in order to provide for frequent stopping and starting of the conveyor belt 41. If such a clutch and brake are utilized the appropriate signals on the lead 60 will cause the clutch to be engaged and the brake to be operated which will stop the belt 41 rather than turn off the motor 47 and the appropriate signal on the lead 60 will disengage the clutch and release the brake rather than turn the motor on. The motor 47 itself would operate continuously.

The unique utilization of the table 11 with the tracks 32 and 33 and the chains 25 and 26 provides an apparatus which maintains positive control over the paddles 30 and 31 so that the high speed transferring of articles is possible without a likelihood of misloading. Furthermore, the apparatus 10 is comparatively low in cost due to the simplicity yet it has very little exposed dangerous machinery which is not the case in many prior art systems.

Although the invention has been described in considerable detail with reference to a certain preferred embodiment it will be understood that variations and modifications may be made within the spirit and scope of the invention as defined in the appended claims.

What is claimed is:

1. Article transferring apparatus comprising article supporting means having an upper surface for supporting an article, first article pushing means associated with said article supporting means for pushing an article in a first direction along the upper surface of said article supporting means, said first article pushing means being movable with respect to said article supporting means, second article pushing means in moving engagement with said first article pushing means for pushing the article in a second direction along the upper surface of said article supporting means, said second article pushing means having projecting means for positively moving said article in said second direction, said second article pushing means being movable with respect to said article supporting means, means operatively associated with said second article pushing means and said article supporting means for causing said second article pushing means to move in a second direction to push the article in a second direction along the upper surface of said article supporting means as said first article pushing means moves to push the article in the first direction along the upper surface of said article supporting means, and means operatively connected to at least one of said article pushing means for driving said first and second article pushing means.

2. The article transferring apparatus of claim 1 further comprising conveying means for conveying articles located near one end portion of said article supporting means, and means for causing operation of said article conveying means.

3. The article transferring apparatus of claim 2 further comprising a roller member located between said article supporting means and said article conveying means.

4. The article transferring apparatus of claim 2 wherein said conveying means is located adjacent to one side of the end portion of said article supporting means.

5. The article transferring apparatus of claim 4 further comprising means associated with said article supporting means and said article conveying means for preventing articles from being placed on said article supporting means while said second article pushing means might interfere with the article.

6. The article transferring apparatus of claim 5 wherein said means for preventing articles from being placed on said article supporting means comprises a control circuit.

7. The article transferring apparatus of claim 6 further comprising means operatively connected to said control circuit for detecting the presence of said article pushing means.

8. The article transferring apparatus of claim 7 further comprising means associated with said conveying means for detecting an article.

9. The article transferring apparatus of claim 8 wherein said article detecting means is operatively connected to said control circuit.

10. The article transferring apparatus of claim 8 wherein said article detecting means comprises a photoelectric detector.

11. The article transferring apparatus of claim 1 further comprising means connected to said second article pushing means for rotatably engaging said first article pushing means.

12. The article transferring apparatus of claim 11 wherein said first article pushing means has at least one rod member and wherein said rotatably engaging means rotatably engages said rod member.

13. The article transferring apparatus of claim 12 wherein said rotatably engaging means comprises a wheel having a rim with projections extending around a portion of said rod member.

14. The article transferring apparatus of claim 1 further comprising means operatively associated with said first and second article pushing means to prevent relative movement therebetween.

15. The article transferring apparatus of claim 14 wherein said means for preventing relative movement comprises a spring member.

16. The article transferring apparatus of claim 1 wherein said first and second pushing means comprises paddle members.

17. The article transferring apparatus of claim 1 further comprising means for determining the location of said second article pushing means.

18. The article transferring apparatus of claim 17 wherein said location determining means comprises at least one magnetic detector.

19. The article transferring apparatus of claim 1 wherein said means for driving said first and second article pushing means comprises a plurality of chain members and further comprising means connected to said first article pushing means and said chain members for permitting movement of said first article pushing means about the ends of said article supporting means and for holding said first and second pushing means in an upright position when said pushing means are located on top of said article supporting means.

20. The article transferring apparatus of claim 19 wherein said means for permitting end movement of said first article pushing means and for holding said first and second pushing means in an upright position comprises a plurality of connecting members connected to said first article pushing means and extending outward from said chain members, said connecting members being rotatably connected to said chain members and supporting means rotatably connected to said chain members and to said connecting members.

21. The article transferring apparatus of claim 1 wherein said article supporting means comprises a table member.

22. The article transferring apparatus of claim 21 wherein said first article pushing means comprises means for pushing an article lengthwise along the upper surface of said table member and said second article pushing means comprises means for simultaneously pushing the article across the width of said table member, whereby an article is pushed diagonally across the upper surface of said table member.

23. The article transferring apparatus of claim 1 wherein said first and second article pushing means each have a pushing surface and the pushing surface of one of said article pushing means is nonparallel to the pushing surface of the other article pushing means.

24. The article transferring apparatus of claim 23 wherein the pushing surface of one of said article pushing means is substantially perpendicular to the pushing surface of the other article pushing means.

25. The article transferring apparatus of claim 1 further comprising a control circuit operatively associated with said pushing means.

* * * * *